United States Patent [19]
Guertler et al.

[11] Patent Number: 5,831,154
[45] Date of Patent: Nov. 3, 1998

[54] PROCESS FOR DETERMINING A LIQUID QUANTITY, PARTICULARLY AN ENGINE OIL QUANTITY IN A MOTOR VEHICLE

[75] Inventors: Thomas Guertler, Stuttgart; Markus Hartmann, Tuttlingen; Klaus Land, Denkendorf; Alfred Weinschenk, Fellbach, all of Germany

[73] Assignee: Mercedes-Benz AG, Stuttgart, Germany

[21] Appl. No.: 789,494

[22] Filed: Jan. 27, 1997

[30] Foreign Application Priority Data

Jan. 25, 1997 [DE] Germany ............ 196 02 599.0

[51] Int. Cl.⁶ .................. G01M 15/00; F01M 11/00
[52] U.S. Cl. .............. 73/117.3; 73/116; 73/291; 73/302; 701/31
[58] Field of Search ................. 73/116, 117.2, 73/117.3, 290 R, 291, 302, 307; 364/424.035, 424.036; 701/30, 31

[56] References Cited

U.S. PATENT DOCUMENTS

| | | | |
|---|---|---|---|
| 4,306,525 | 12/1981 | Faxvog | 123/196 S |
| 4,806,847 | 2/1989 | Atherton et al. | 324/61 P |
| 4,862,393 | 8/1989 | Reid et al. | 364/424.035 |
| 4,949,069 | 8/1990 | Wilson | 340/450.1 |
| 5,060,156 | 10/1991 | Vajgart et al. | 364/424.035 |
| 5,072,615 | 12/1991 | Nawrocki | 73/291 |
| 5,282,386 | 2/1994 | Niemczyk et al. | 73/292 |
| 5,382,942 | 1/1995 | Raffa et al. | 340/457.4 |
| 5,530,647 | 6/1996 | Sem et al. | 364/424.035 |
| 5,633,796 | 5/1997 | Cullen et al. | 364/424.035 |

FOREIGN PATENT DOCUMENTS

| | | |
|---|---|---|
| 0 191 458 | 8/1986 | European Pat. Off. . |
| 0 234 906 | 9/1987 | European Pat. Off. . |
| 0 515 326 | 11/1992 | European Pat. Off. . |
| 40 38 972 | 11/1991 | Germany . |
| 41 18 896 | 12/1992 | Germany . |
| 44 29 234 | 8/1995 | Germany . |

*Primary Examiner*—George M. Dombroske
*Attorney, Agent, or Firm*—Evenson, McKeown, Edwards & Lenahan, P.L.L.C.

[57] ABSTRACT

A process for determining the quantity of a liquid situated in a largely closed system of a motor vehicle is provided. The filling level of the liquid in the system fluctuates as a function of the driving condition. In the case of a known process of this type for determining the engine oil quantity, the oil quantity determination takes place by filling level measurements while the vehicle is standing and the engine is switched off. The present process determines driving-condition-indicating quantities in the driving operation, determines therefrom the momentary driving condition, and, at least during selected driving conditions in the driving operation, continuously sense the filling level, as well as determines therefrom the momentary filling quantity via a given dependence of the liquid quantity on the driving condition and on the filling level. This permits, for example, a monitoring of the engine oil quantity in the continuous driving operation.

16 Claims, 1 Drawing Sheet

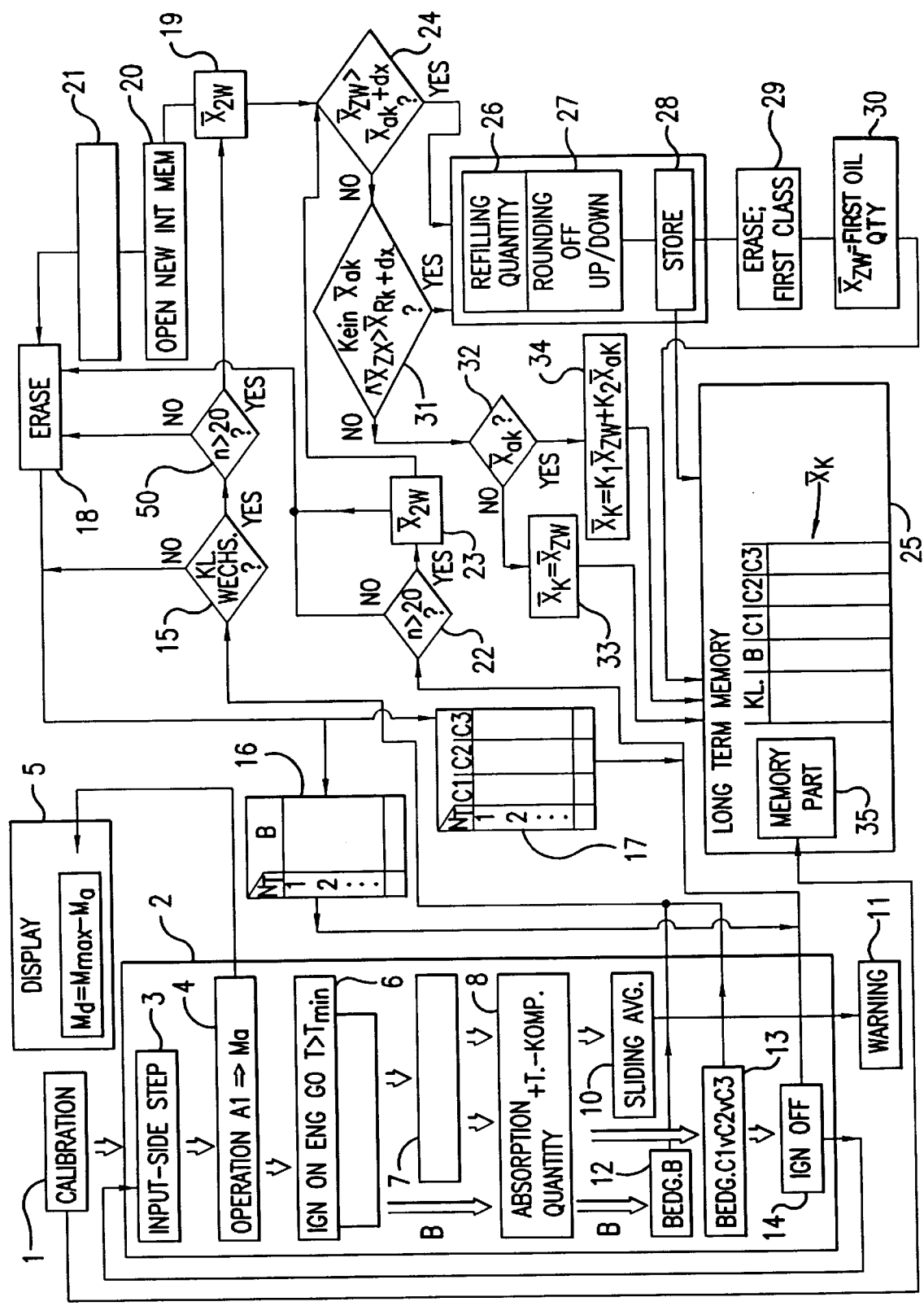

PROCESS FOR DETERMINING A LIQUID QUANTITY, PARTICULARLY AN ENGINE OIL QUANTITY IN A MOTOR VEHICLE

BACKGROUND AND SUMMARY OF THE INVENTION

This invention relates to a process for determining a liquid quantity situated in a largely closed system of a motor vehicle, the level of the liquid fluctuating as a function of the driving condition. In particular, the invention relates to a process for determining the engine oil quantity.

From European Patent document EP 0 191 458 B1, a warning system concerning the engine oil aging in a motor vehicle is known, in which, after the ignition is switched on and before the starting of the engine, an engine oil level is detected in each case and is compared with the previously existing level value. If the actually detected oil level value is no larger than the previous value, the latter is updated by the newly measured value. During the subsequent driving operation after the starting of the engine, an integral, oil-aging-indicative quantity is derived from the detection of the carried-out driving performance, the oil temperature and the engine speed and, in parallel thereto, an oil usage duration is determined. As soon as these quantities have reached predetermined limit values, an oil change warning is generated. If, during a comparison of the newly measured oil level with the previously existing value, the former is found to be larger than the latter, this is interpreted to mean that an oil refilling or changing operation has taken place in the preceding vehicle stoppage phase. In this case, the integral oil-aging-specific quantity and the oil usage duration detected in parallel thereto are set to actual values which take into account that fresh oil was added at a specific proportion.

In German Patent document DE 40 38 972 C1, an arrangement for calculating a servicing interval of a motor vehicle is described in the case of which, by way of a flow sensor arranged at a suitable point in an oil filler neck or an oil level meter installed into the engine oil pan, the oil quantity refilled in the case of an engine oil refilling operation is sensed. As a function of the determined oil refilling quantity, the normal servicing interval is extended by a defined time period or a defined driving performance. Several operational values, such as the number of starts, the crankshaft revolutions, the driving and stoppage times, the engine temperature, the engine oil pressure, the charge air pressure, the oil consumption and the fuel consumption are entered into the calculation of the servicing interval.

In U.S. Pat. No. 4,306,525, an engine oil indicating device is disclosed by means of which, during the starting of the engine, a measuring of the oil level is carried out and, during a later time interval, an opacity measuring is carried out for judging the engine oil aging condition.

In all of the above-mentioned known processes, the filling level measuring operations are limited to those time periods in which the vehicle stands with the engine turned-off in order to avoid measuring errors due to the driving-condition-dependent fluctuating filling level. During the continuous driving operation, no monitoring of the liquid quantity and thus of the liquid consumption takes place. However, this is frequently desirable, for example, for determining the engine oil consumption as a function of the driving performance for diagnostic servicing purposes and for recognizing an excessive oil consumption or required refilling operations during the continuous driving operation.

In German Published Patent Application DE 44 29 234 A1, a process for determining the oil consumption of an engine in a vehicle is described. This process uses an oil level switch or, as an alternative, a temperature sensor. By means of the oil level switch, it is determined whether the momentary filling level is above or below a predetermined response level. By means of the temperature sensor, temperature jumps can be determined which are the result of the exceeding of, or falling-below, the pre determined oil level. The frequency of a determined exceeding or falling-below the predetermined oil level is marked off in a histogram as a function of the rotational engine speed. In this case, it may be provided to take into account only the exceeding of or falling-below the predetermined oil level in which the oil temperature is within a defined temperature window and/or the engine torque does not experience any excessive changes. The histogram will then be evaluated with respect to the relative frequency of one of the two possible oil level inquiry conditions as a function of the rotational speed. The obtained result is compared with a predetermined characteristic oil quantity diagram which reflects the oil quantity as a function of the rotational engine speed and this relative frequency of the level inquiry condition, from which the actual oil quantity is then estimated.

The present invention is based on the technical problem of providing a process of the above-mentioned type by which the liquid quantity in a largely closed system of a motor vehicle can be determined comparatively reliably by way of filling level measurements despite a filling level which fluctuates as a function of the driving condition, also in the continuous driving operation.

This problem is solved by the process for determining the quantity of a liquid situated in a largely closed system of a motor vehicle, the filling level of the fluid in the system fluctuating as a function of the driving condition, particularly the engine oil quantity. In the driving operation, driving-condition-indicative quantities are sensed and the momentary driving condition is determined therefrom. At least during selected driving conditions in the driving operation by means of a filling level sensor, the momentary value of the filling level is sensed continuously and, by means of a predetermined dependence of the liquid quantity on the driving condition and on the filling level, the momentary filling quantity is determined.

For this purpose, driving-condition-indicative quantities are determined in the driving operation from which the momentary driving condition is determined. At least during selected driving conditions, the liquid level pertaining to the respective driving condition is detected continuously in the driving condition and, by means of a predetermined dependence of the fluid quantity on the driving conditions and the filling level, the momentary filling quantity is determined. This type of determination of the liquid quantity remains largely uninfluenced by the driving-condition-dependent fluctuations of the liquid filling level because these fluctuations can be calculated out as the result of the matchingly predetermined dependence of the liquid level and therefore of the amount of fluid from the driving condition and, in addition, can be statistically averaged out because of the continuous obtaining of measuring values. This permits the reliable determination of the fluid quantity whose level fluctuates as a function of the driving condition by way of level measurements not only when the vehicle is stopped and the engine is switched-off, but also in the continuous driving operation. As a result, for example, an underfilling or overfilling of engine oil or the reaching of a minimum amount of oil can be recognized and indicated continuously during the drive. Furthermore, the obtained data concerning the respective engine oil quantity can be used for determining the oil consumption as a function of the driving performance, whereby in a comparatively precise manner, oil consumption data can also be obtained for operating cycles with long uninterrupted driving operation phases. The oil consumption data can be stored for the direct oil consumption control in real-time as well as for diagnostic servicing purposes.

A further advantageous development of the invention provides a temperature compensation for the determination of the liquid quantity. The temperature compensation takes into account fluctuations because of the temperature-dependent expansion of the liquid.

A particularly advantageous further development of the invention provides for the case of the determination of the engine oil quantity to detect the rotational engine speed as a driving-condition-specific quantity and to take it into account when determining the amount of oil. This takes into account the fact that, in the case of a given engine oil quantity, in the continuous engine operation, a proportion of oil which is a function of the rotational speed of the engine is in circulation as the so-called absorption quantity and is not detected by a momentary level measurement. This absorption quantity proportion can be determined from the knowledge of the rotational engine speed and can be taken into account when converting the measured level into the momentary oil quantity in a correcting manner.

In a further advantageous development of the invention, the driving performance between liquid refilling operations is divided into driving performance classes, for example, into intervals of a length of 50 km or 100 km. For each driving performance class, average filling quantity values are calculated individually from the measured filling quantity values in each case determined for this class. By means of this statistical averaging procedure, atypical level measuring values, which are caused, for example, by an intense braking of the vehicle or sudden changes of the rotational-engine speed, are averaged out. This increases the reliability of the determination of the liquid quantity. In addition, this measure permits the determination of the course of the liquid consumption, for example, of the engine oil consumption, as a function of the driving performance by means of reliable, statistically averaged data.

In a further advantageous development of the invention, several mutually separate driving condition ranges, for example, with a different driving speed and/or rotational engine speed, are selected from the totality of possible driving conditions. In this case, the determined liquid quantities are in each case specifically assigned to the momentary driving condition. For example, in this manner, determinations of the fluid quantity on city driving sections, country road sections and autobahn (highway) driving sections may differ from one another and, as required, can be evaluated differently. Thus, the filling quantity values based on level measurements during autobahn driving can be weighted more than those of city driving in order to take into account the fact that the level fluctuations during more uniform autobahn driving on average are lower than during city driving when a vehicle speed change takes place more frequently.

In a further development of the invention, in addition, a filling quantity determination is provided after the ignition is switched-on and before the starting of the engine as a function of the filling level, the oil temperature and the vehicle switch-off time. With the indication of a sufficiently long switch-off time which is required for the oil to flow back into the oil pan after the engine is switched off, by means of this level measuring with a subsequent temperature compensation, a very reliable liquid quantity value is obtained which may be used, for example, for indicating to the driver at the start of the drive the liquid deficit as the difference between a maximal filling quantity and the momentary filling quantity.

Other objects, advantages and novel features of the present invention will become apparent from the following detailed description of the invention when considered in conjunction with the accompanying drawings.

BRIEF DESCRIPTION OF THE DRAWINGS

The single FIGURE is a program flow chart of a process for determining the engine oil quantity by means of engine oil level measurements according to the invention.

DETAILED DESCRIPTION OF THE DRAWINGS

The process whose sequence is illustrated in the FIGURE is used for the on-board determination of the respective momentary engine oil quantity by way of continuous level measurements not only when the vehicle is standing and the engine is switched-off, but also during the continuous driving operation. The process is implemented in the vehicle electronic system of the pertaining motor vehicle in a manner which is indicated to the person skilled in the art by means of the following description of its method of operation. In particular, the pertaining hardware comprises a computer unit, an electronic memory with a sufficient capacity and peripheral units, for example, for the data input and for displaying warnings as well as the respective determined quantity of engine oil. In addition, a conventional oil sensor is provided which senses the oil level, the oil quality and the oil temperature and transmits this information to the computer unit.

First, a one-time filling level calibration to the maximal oil quantity obtained for the specific engine is carried out in a first step 1 during the vehicle manufacturing or in a shop, by means of which oil quantity the maximal level is precisely determined which pertains to this maximal oil quantity. As a result, manufacturing tolerances and changes in the geometry of the engine oil circulating system, for example, the oil pan, are taken into account. The obtained calibration value is filed in a memory part 35 of a long-term memory 25, the latter being implemented as a non-volatile memory whose memory content is maintained even when the ignition is switched off.

In the next part of the process 2, a respective determination of the oil quantity will then take place as a function of the driving condition. In addition to the information furnished by the oil sensor concerning the oil level, the oil temperature and the oil quality, the input quantities for this purpose are the rotational engine speed, the vehicle speed, the driving performance, that is, the mileage, and the ignition status. The process part 2 starts with an input-side step 3 in which it is determined whether the ignition is switched on and the engine is not yet started. If this condition (A1) has been present and uninterrupted for a given waiting period of, for example, 10 s, by means of a level measurement, the actual oil quantity ($M_a$) is determined via a given characteristic curve of the oil quantity as a function of the level (step 4). By means of the indication of the waiting period, it is ensured that any possible previously circulating engine oil has returned into the oil pan so that, by means of this measuring operation, the current oil quantity value can be determined without any corrections as a function of the rotational engine speed. In this case, only a temperature correction is also taken into account in that the oil quantity resulting from the level is scaled by way of a fixed scaling factor ($T_s$) of approximately 0.07%/°C. to a constant reference temperature of 100° C. The resulting oil quantity value ($M_a$) is then compared with the calibrated maximum oil quantity value ($M_{max}$) after which the resulting difference is displayed to the driver as an oil quantity deficit ($M_d$) by way of an optical display device (step 5).

In a next step (6), it is inquired whether the ignition is switched on (IGN ON) and the engine was started (ENG GO) and whether the oil temperature is already above a predetermined minimum value ($T_{min}$) of, for example, 60° C. As soon as this condition is reached, which characterizes the driving operation with a largely warmed-up engine, measurements of the actual engine filling level take place cyclically with a given repetition rate (step 7). However, in this continuous driving operation, the filling level (ACTUAL LVL) is subjected to high dynamic fluctuations; in particular, the so-called absorption quantity, that is, the proportion of the engine oil which is circulating when the engine is running or does not contribute to the level in the oil pan is a function of the rotational engine speed. Furthermore, various movements and side tilts of the vehicle body cause a sloshing and slanting of the engine oil level. The effects of different engine oil temperatures during the driving operation are controlled by the indication of the minimum oil temperature and otherwise by the above-described scaling to the reference temperature value.

The measured filling level values are, on the one hand, processed in order to recognize critical oil levels. Individual oil splashes must not impair the average value, which is why measured values which deviate excessively from neighboring values are ignored or, following conventional damping measures for achieving a level detection which is sufficiently slow with respect to sudden level fluctuations, are adapted to neighboring values. In this case, the latter is implemented here with respect to the software by means of a suitable digital filter. The filter function can, for example, be such that the measured filling level value results, with respect to a specific fraction, from the actual uncorrected measured value plus a residual fraction from the preceding measured value. For example, in a weighted manner, the actual measured value may contribute by 75% and the preceding measured value may contribute by 25%. As described above, the filtered measured filling level values will then be scaled to the reference temperature value in order to take into account the respective temperature expansion of the engine oil (step 9). In the same step 9, the measured level value is corrected by the respective momentary absorption quantity proportion. For this purpose, an engine-specific characteristic curve is given which indicates the absorption quantity proportion and thus the filling level changes caused by it as a function of the rotational engine speed. The thus corrected measured filling level values are then subjected to a sliding average formation, for example, by way of the respective last 20 values (step 10). A corresponding filtering and sliding average formation is also provided for achieving corrected values from conventional oil quality measurements which are not described here in order to also diminish for this measured quantity the influence of singular measured values as may occur with respect to the filling level, for example, by an intense braking of the vehicle or sudden changes of the rotational speed. If now the sliding average filling level value determined in this manner is above the calibrated maximal level or has fallen to a given level minimum or is already noticeably below it, by means of a warning light, a corresponding overfilling, minimum filling or underfilling warning will take place (step 11).

In parallel to this filling level warning monitoring, the filling level values which were measured and then corrected with respect to the temperature and the absorption quantity are used to continuously obtain actual oil quantity values in the continuous driving operation, divided into four different driving operation ranges (B, C1, C2, C3). The driving operation range with vehicle speeds below 5 km/h and a rotational engine speed between 100 rpm and 800 rpm is defined as range (B). It occurs, for example, when the vehicle, while the engine is running, is standing in front of a red traffic light. The three other ranges are defined in that the rotational engine speed is in each case above 1,000 rpm and the vehicle speed is between 5 km/h and 60 km/h, 60 km/hr and 110 km/h and above 110 km/h respectively, which corresponds to typical city driving, country road driving and autobahn driving. In the pertaining process steps 12, 13, it is inquired whether the conditions for one of the four ranges (B, C1, C2, C3) are met. After this, from the corrected measured filling level value of the respective timing cycle, by means of an engine-specific characteristic oil quantity-filling level curve, as mentioned above, an oil quantity value is determined which is specifically assigned to the corresponding driving condition range. The oil quantity value, which was thus obtained by a level measurement in the continuous driving operation and was corrected with respect to driving-dynamic fluctuation influences, will then be processed as described in the following while the process part 2 is repeated in a timed manner to obtain the next actual oil quantity value until the switching-off of the ignition (step 14) is recognized.

For further processing of a respective obtained oil quantity value, it is first inquired (step 15) whether the actual mileage has changed since the last recognized engine oil refilling from one driving performance class into the next higher class, in which case the driving performance since the last oil refilling is divided into these driving performance classes with a predetermined interval length, for example, a first class of from 0 km to 50 km, a second class of from 50 km to 100, etc. As long as this is not so, the new oil quantity value is written into an intermediate memory 16 for the driving condition range (B) or into respective parts of an intermediate memory 17 for the driving condition ranges (C1, C2, C3). The oil quantity values are stored separately according to the four driving condition ranges (B, C1, C2, C3). If, on the other hand, a driving performance class change was recognized, it is determined in a next inquiry step 50 whether a number (n) of more than 20 individual values already exist in the intermediate memory 16 for the actual driving condition range in the previous driving performance class. If this is not so, these values are not taken into account in that the actual intermediate memory is erased. (step 18). If, on the other hand, more than 20 values are present, before the erasing of the actual intermediate memory (step 18), the average value ($x_{zw}$) is first formed (step 19); then a new intermediate memory part is opened up (step 20); and the newest oil quantity value is written as a first single value into the newly opened intermediate part.

Analogously, after the writing-in of a new oil quantity value into one of the intermediate memory ranges 16, 17, as well as after the switching-off of the ignition (step 14), a similar inquiry takes place with respect to the presence of more than 20 single values in the actual intermediate memory range (step 22). If no 20 single values were successively written into the same intermediate memory part of one of the four driving condition ranges (B, C1, C2, C3), these values again are not taken into account, and the actual intermediate memory is erased (step 18). If more than 20 single values are present, the determination again takes place of their, for example, arithmetical average value ($x_{zw}$) (step 23), after which the actual intermediate memory part will then be erased (step 18).

After a respective average value formation of intermediate memory single values (steps 19 and 23), it is examined in a subsequent inquiry step 24 whether this oil quantity average value ($x_{zw}$) is larger than an average value ($x_{ak}$) currently present for the actual driving performance class and the actual driving condition range and stored in the pertaining long-term memory plus an additional increment (dx) of, for example, 0.5 liters. If this is so, it is interpreted by the system as a preceding oil refilling operation, in which case the addition (dx) is expediently selected to be of a magnitude in which typically the smallest refilling quantity unit is situated. Taking this into account, the refilled oil quantity is subsequently determined (step 26) in that the difference between the intermediate memory average value ($x_{zw}$) and the long-term intermediate value ($x_{ak}$) of the actual class is determined and is subsequently rounded off up or down to a multiple of the smallest refilling quantity unit, for example 0.51, (step 27). The determined oil refilling quantity is then stored together with the pertaining actual mileage of the vehicle (step 28), in which case these data can then later be called up again for diagnostic servicing purposes. The recognition of an oil refilling operation also has the result that first the long-term memory content concerning the oil quantity values is erased and set back to the first driving performance class (step 29), after which the new intermediate memory average value ($x_{zw}$) is written as a first oil quantity value into the long-term memory (step 30) after the refilling operation.

If the above-mentioned oil-refill-recognizing inquiry 24 is answered negatively, it is examined whether no average value is entered in the long-term memory 25 with respect to the actual driving performance class and whether in this case the intermediate memory average value ($x_{zw}$) is larger than the average value ($x_{lk}$) of the next lower driving performance class plus the additional increment (dx) stored in the long-term memory 25 (step 31). If this is the case, this is again interpreted as a previously occurring oil refilling operation and the process is continued as described above. In this case, the non-existing average value of the actual class in the long-term memory 25 is replaced by that ($x_{lk}$) of the next-lower class. If, on the other hand, this inquiry 31 also ends negatively, no oil refilling operation has taken place and it is then examined whether an average oil quantity value ($x_{ak}$) for the actual driving performance class is already filed in the long-term memory 25 (step 32). If this is not so, the determined actual intermediate memory average value ($x_{zw}$) is filed as a first average oil quantity value ($x_k$) for this driving performance class in the corresponding driving condition long-term memory range (step 33). If, on the other hand, an average value ($x_{ak}$) is already stored in the long-term memory 25 for this driving performance class and the actual driving condition range, from this previously filed value ($x_{ak}$) and the new intermediate memory average value ($x_{zw}$) a weighted new average value ($x_k$) is determined and the corresponding memory content of the long-term memory 25 is thereby updated (step 34). In this case, the weighting ($k_1$, $k_2$) takes place corresponding to the number of the individual oil quantity values contributing to the respective average value, that is, $0 \leq k_1$, $k_2 \leq 1$ and $k_2 = 1 - k_1$.

In this manner, oil quantity values determined starting from an oil refilling operation are stored in the long-term memory 25 specifically assigned to the respective driving performance since the oil refilling and the individual driving condition ranges (B, C1, C2, C3). As soon as an oil refilling operation was determined, before the erasing of the average oil quantity values ($x_k$) filed in the long-term memory 25, a straight recursion line is determined separately for each driving condition range from the values of the individual driving performance classes, the slope of the straight recursion line corresponding to the engine oil consumption in the respective driving condition range and being stored in a consumption memory. In this case, oil consumption values are expediently determined in each case for a predetermined, preceding driving performance, for example the last 1,000 km, by taking into account a corresponding number of earlier driving performance classes. This is done so that, for each driving condition range (B, C1, C2, C3), successive oil consumption values exist in the consumption memory at a grid distance of, for example, 1,000 km. The differentiation between different driving condition ranges (B, C1, C2, C3) also permits carrying out a weighting of the average oil quantity values or the oil consumption values. In particular, it may be provided to weight the autobahn driving range (C3) higher than the country road driving range (C2) and to weight the latter, in turn, higher than the city driving range (C1) corresponding to the driving-condition dependent filling level fluctuations which, on average, are lower in the autobahn driving phases with a correspondingly higher reliability of the level measurements.

As demonstrated by the above, the process permits a continuous on-board monitoring and determination of the actual engine oil quantity not only when the engine is switched off but also during the driving operation. In addition to warnings concerning an oil level which is too high or too low, particularly oil refilling operations are automatically recognized by the system, in which case the refilled oil quantity is determined automatically. In addition, the oil consumption can be determined as a function of the driving performance since a last refilling operation as well as specifically for different driving conditions. It is understood that also other liquids used in largely closed systems within a motor vehicle can be monitored by way of filling level measurements via the process according to the invention with respect to the actually existing liquid quantity and information derived therefrom, such as the liquid consumption, can be monitored. According to the application, the individual process parameters can be appropriately modified with respect to the parameter values of the above-described example.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for determining an engine oil quantity of engine oil contained in a largely closed system of a motor vehicle, wherein a filling level of the engine oil in the system fluctuates as a function of a driving condition, the process comprising the steps of:

sensing driving-condition-indicative quantities in a driving operation of the motor vehicle, including a rotational engine speed;

determining momentary driving conditions based on said sensed driving-condition-indicative quantities in the driving operation of the motor vehicle;

at least during selected driving conditions in the driving operation, continuously sensing a momentary value of the filling level via a filling level sensor; and

9 determining the engine oil quantity while factoring into account an absorption quantity proportion determined via a given absorption quantity proportion-rotational engine speed dependence relationship.

2. The process according to 1, further comprising the steps of:

sensing a temperature of the engine oil contained in the largely closed system of the motor vehicle; and relating the engine oil quantity of the engine oil to a predetermined reference temperature ($T_R$) via a predetermined scaling factor ($T_S$).

3. The process according to claim 1, further comprising the steps of:

dividing a driving performance between liquid refilling operations into driving performance classes; and separately determining for each class average filling quantity values from individual filling quantity values determined for the respective class.

4. The process according to claim 1, further comprising the steps of:

selecting several mutually different speed ranges (B, C1, C2, C3) from a totality of possible driving conditions; and assigning the filling quantity values in each case to a pertaining speed range.

5. The process according to claim 1, further comprising the steps of:

after an ignition is switched-on and before a starting of an engine of the motor vehicle, sensing a filling level, a liquid temperature, and a vehicle switch-off time; and determining a momentary liquid quantity from the sensed filling level, liquid temperature, and vehicle switch-off time.

6. A process for determining a quantity of a liquid contained in a largely closed system of a motor vehicle, wherein a filling level of the liquid in the system fluctuates as a function of a driving condition, the process comprising the steps of:

sensing driving-condition-indicative quantities in a driving operation of the motor vehicle;

determining momentary driving conditions based on said sensed driving-condition-indicative quantities in the driving operation of the motor vehicle;

at least during selected driving conditions in the driving operation, continuously sensing a momentary value of the filling level via a filling level sensor; and determining a momentary filling quantity via a predetermined dependence of the quantity of the liquid based on the driving condition and the filling level;

dividing a driving performance between liquid refilling operations into driving performance classes; and separately determining for each class average filling quantity values from individual filling quantity values determined for the respective class.

7. The process according to claim 6, further comprising the steps of:

selecting several mutually different speed ranges (B, C1, C2, C3) from a totality of possible driving conditions; and assigning the filling quantity values in each case to a pertaining speed range.

8. The process according to claim 6, further comprising the steps of:

after an ignition is switched-on and before a starting of an engine of the motor vehicle, sensing a filling level, a liquid temperature, and a vehicle switch-off time; and

10 determining a momentary liquid quantity from the sensed filling level, liquid temperature, and vehicle switch-off time.

9. The process according to claim 6, further comprising the steps of:

sensing a temperature of the liquid contained in the largely closed system of the motor vehicle; and relating the quantity of the liquid to a predetermined reference temperature ($T_R$) via a predetermined scaling factor ($T_S$).

10. A process for determining a quantity of a liquid contained in a largely closed system of a motor vehicle, wherein a filling level of the liquid in the system fluctuates as a function of a driving condition, the process comprising the steps of:

sensing driving-condition-indicative quantities in a driving operation of the motor vehicle;

determining momentary driving conditions based on said sensed driving-condition-indicative quantities in the driving operation of the motor vehicle;

at least during selected driving conditions in the driving operation, continuously sensing a momentary value of the filling level via a filling level sensor; and determining a momentary filling quantity via a predetermined dependence of the quantity of the liquid based on the driving condition and the filling level;

selecting several mutually different speed ranges (B, C1, C2, C3) from a totality of possible driving conditions; and assigning the filling quantity values in each case to a pertaining speed range.

11. The process according to claim 10, further comprising the steps of:

dividing a driving performance between liquid refilling operations into driving performance classes; and separately determining for each class average filling quantity values from individual filling quantity values determined for the respective class.

12. The process according to claim 10, further comprising the steps of:

after an ignition is switched-on and before a starting of an engine of the motor vehicle, sensing a filling level, a liquid temperature, and a vehicle switch-off time; and determining a momentary liquid quantity from the sensed filling level, liquid temperature, and vehicle switch-off time.

13. The process according to claim 10, further comprising the steps of:

sensing a temperature of the liquid contained in the largely closed system of the motor vehicle; and relating the quantity of the liquid to a predetermined reference temperature ($T_R$) via a predetermined scaling factor ($T_S$).

14. An apparatus for determining an engine oil quantity of an engine oil contained in a largely closed system of a motor vehicle, wherein a filling level of the engine oil in the system fluctuates as a function of a driving condition, the apparatus comprising:

sensors which determine driving-condition-indicative quantities in a driving operation of the motor vehicle, including a rotational engine speed;

a computer having a memory, said computer receiving signal outputs from said sensors, wherein said computer is programmed to perform the steps of:

at least during selected driving conditions in the driving operation, continuously sensing a momentary value of the filling level via a filling level sensor; and determining the engine oil quantity while factoring into account an absorption quantity proportion determined via a given absorption quantity proportion-rotational engine speed dependence relationship.

15. An apparatus for determining a quantity of a liquid contained in a largely closed system of a motor vehicle, wherein a filling level of the liquid in the system fluctuates as a function of a driving condition, the apparatus comprising:

sensors which determine driving-condition-indicative quantities in a driving operation of the motor vehicle;

a computer having a memory, said computer receiving signal outputs from said sensors, wherein said computer is programmed to perform the steps of:

at least during selected driving conditions in the driving operation, continuously sensing a momentary value of the filling level via a filling level sensor;

determining a momentary filling quantity via a predetermined dependence of the quantity of the liquid based on the driving condition and the filling level;

dividing a driving performance between liquid refilling operations into driving performance classes; and separately determining for each class average filling quantity values from individual filling quantity values determined for the respective class.

16. An apparatus for determining a quantity of a liquid contained in a largely closed system of a motor vehicle, wherein a filling level of the liquid in the system fluctuates as a function of a driving condition, the apparatus comprising:

sensors which determine driving-condition-indicative quantities in a driving operation of the motor vehicle;

a computer having a memory, said computer receiving signal outputs from said sensors, wherein said computer is programmed to perform the steps of:

at least during selected driving conditions in the driving operation, continuously sensing a momentary value of the filling level via a filling level sensor;

determining a momentary filling quantity via a predetermined dependence of the quantity of the liquid based on the driving condition and the filling level;

selecting several mutually different speed ranges (B, C1, C2, C3) from a totality of possible driving conditions; and assigning the filling quantity values in each case to a pertaining speed range.

* * * * *